(12) United States Patent
Kato et al.

(10) Patent No.: US 11,705,569 B2
(45) Date of Patent: Jul. 18, 2023

(54) COMPOSITE POLYMER ELECTROLYTE MEMBRANE

(71) Applicant: Asahi Kasei Kabushiki Kaisha, Tokyo (JP)

(72) Inventors: Kazuki Kato, Tokyo (JP); Junji Sakuda, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 799 days.

(21) Appl. No.: 16/498,057

(22) PCT Filed: Apr. 3, 2018

(86) PCT No.: PCT/JP2018/014242
§ 371 (c)(1),
(2) Date: Sep. 26, 2019

(87) PCT Pub. No.: WO2018/186386
PCT Pub. Date: Oct. 11, 2018

(65) Prior Publication Data
US 2021/0104766 A1    Apr. 8, 2021

(30) Foreign Application Priority Data

Apr. 3, 2017 (JP) .............................. JP2017-074006

(51) Int. Cl.
*H01M 8/1062* (2016.01)
*H01M 8/1041* (2016.01)
*H01M 8/1067* (2016.01)

(52) U.S. Cl.
CPC ....... *H01M 8/1062* (2013.01); *H01M 8/1041* (2013.01); *H01M 8/1067* (2013.01); *H01M 2300/0082* (2013.01)

(58) Field of Classification Search
CPC ............. H01M 8/1062; H01M 8/1041; H01M 8/1067; H01M 2300/0082; H01M 8/10;
(Continued)

(56) References Cited

U.S. PATENT DOCUMENTS

2002/0045085 A1    4/2002   Formato et al.
2009/0325005 A1   12/2009   Calis et al.
(Continued)

FOREIGN PATENT DOCUMENTS

CN    102612780 A    7/2012
JP    2003-165845 A   6/2003
(Continued)

OTHER PUBLICATIONS

International Search Report issued in corresponding International Patent Application No. PCT/JP2018/014242 dated Jul. 10, 2018.
(Continued)

*Primary Examiner* — Helen Oi K Conley
(74) *Attorney, Agent, or Firm* — Morgan, Lewis & Bockius LLP

(57) ABSTRACT

A composite polymer electrolyte membrane comprising a nanofiber sheet having a basis weight of 1.5 $g/m^2$ or more and 4.0 $g/m^2$ or less, and a proton-conducting polymer, the electrolyte membrane having a sheet shape in which the proton-conducting polymer and the nanofiber sheet are combined, and having an average coefficient of linear expansion of 300 ppm/K or less from 20° C. to 120° C. in an in-plane direction of the sheet shape.

9 Claims, 3 Drawing Sheets

(58) Field of Classification Search
CPC ... Y02E 60/50; B32B 5/02; C08J 5/22; H01B 1/06
See application file for complete search history.

(56) References Cited

U.S. PATENT DOCUMENTS

| | | | |
|---|---|---|---|
| 2010/0234514 A1* | 9/2010 | Noguchi | C08K 7/24 524/496 |
| 2012/0028086 A1* | 2/2012 | Shi | H01M 50/491 429/50 |
| 2012/0231355 A1 | 9/2012 | Lee et al. | |
| 2013/0101918 A1 | 4/2013 | Yandrasits et al. | |
| 2014/0120431 A1* | 5/2014 | Roelofs | H01M 8/103 429/408 |
| 2019/0367676 A1 | 12/2019 | Kanada et al. | |

FOREIGN PATENT DOCUMENTS

| | | |
|---|---|---|
| JP | 2003-528420 A | 9/2003 |
| JP | 2004-185973 A | 7/2004 |
| JP | 2008-166006 A | 7/2008 |
| JP | 2009-543949 A | 12/2009 |
| JP | 2010-232121 A | 10/2010 |
| JP | 2011-216269 A | 10/2011 |
| JP | 2012-238590 A | 12/2012 |
| JP | 2014-525115 A | 9/2014 |
| JP | 5798186 B2 | 10/2015 |
| JP | 2016-058152 A | 4/2016 |
| KR | 10-2015-0129302 A | 11/2015 |
| WO | 2016/020668 A1 | 2/2016 |
| WO | 2018/155598 A1 | 8/2018 |

OTHER PUBLICATIONS

Supplementary European Search Report issued in counterpart European Patent Application No. 18781649.1 dated Feb. 24, 2020.
International Preliminary Report on Patentability and Written Opinion issued in corresponding PCT/JP2018/014242 dated Oct. 8, 2019.

* cited by examiner

[Fig. 1]
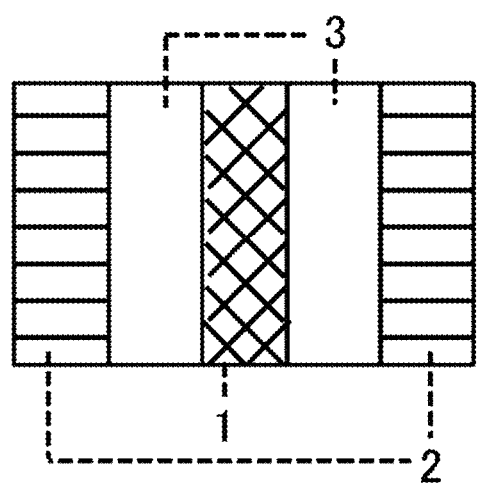
[Fig. 2]
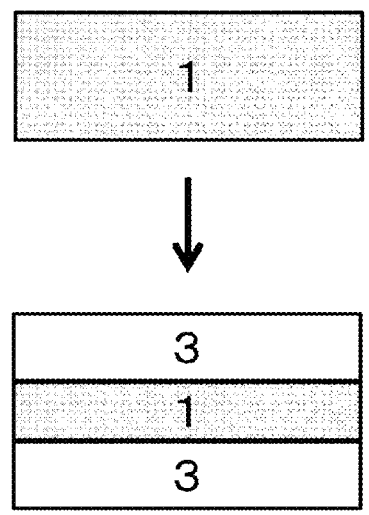

[Fig. 3]
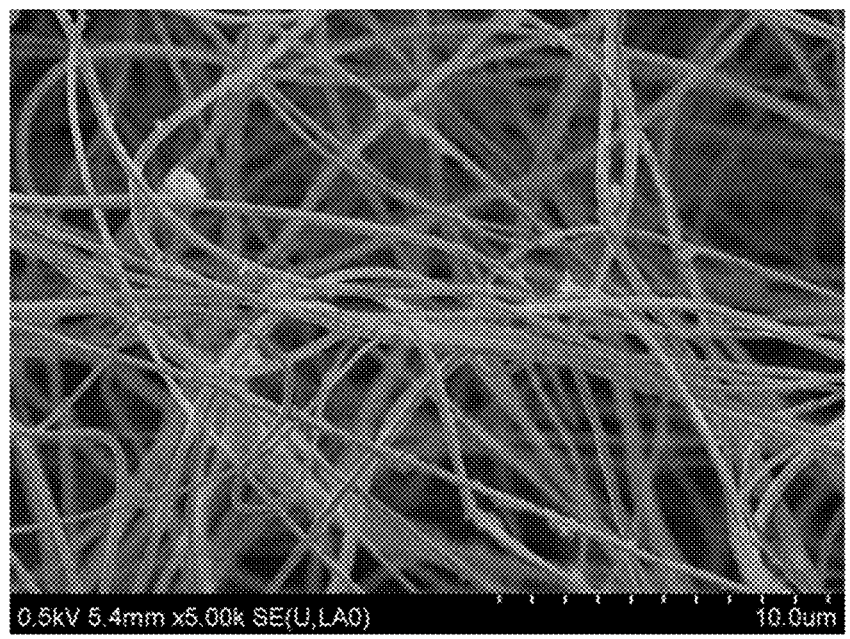
[Fig. 4]
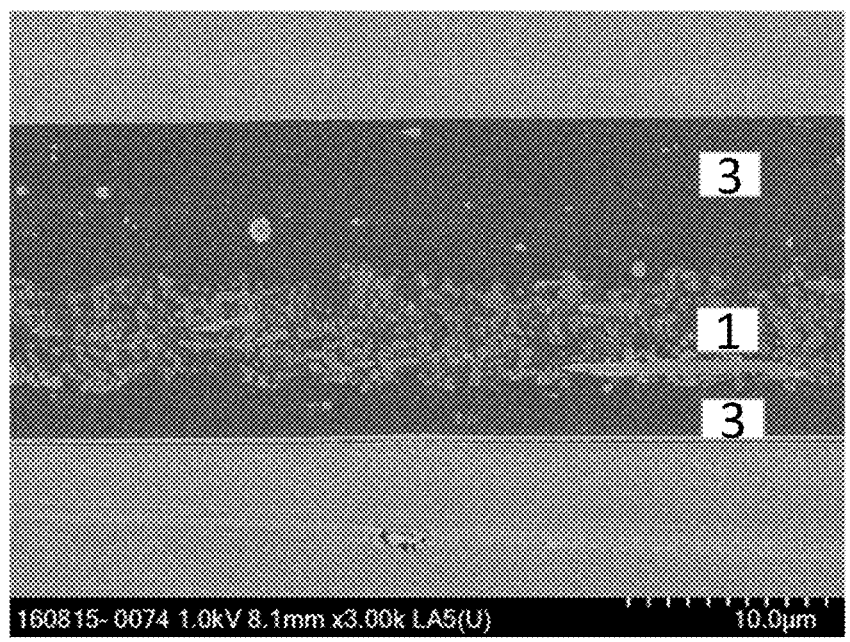

[Fig. 5]
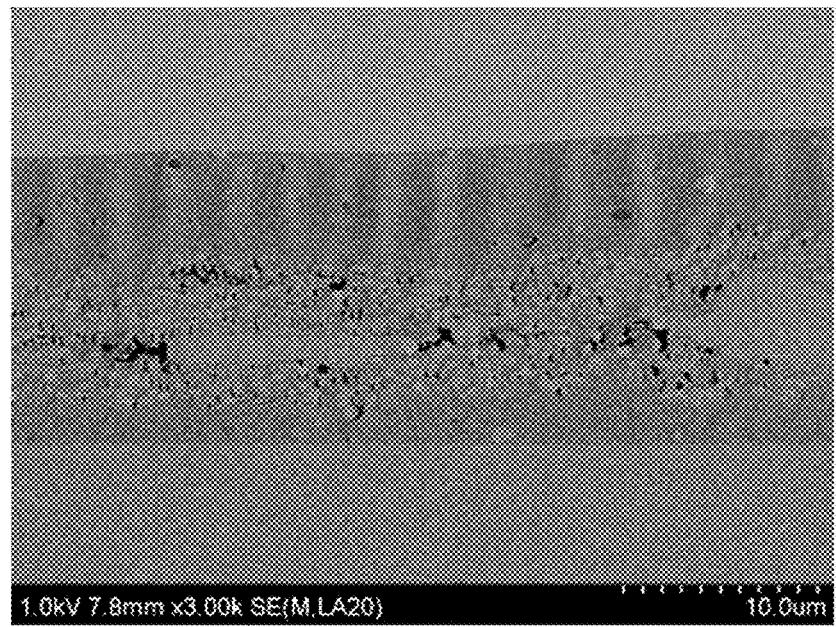

COMPOSITE POLYMER ELECTROLYTE MEMBRANE

TECHNICAL FIELD

The present invention relates to the provision of a composite polymer electrolyte membrane.

BACKGROUND ART

Fuel cells electrochemically oxidize hydrogen, methanol, or the like in the cells to directly convert the chemical energy of the fuel into electrical energy for extraction. Therefore, fuel cells attract attention as clean electrical energy sources. Particularly, polymer electrolyte fuel cells operate at low temperatures compared with other fuel cells and therefore are expected as automobile alternative power sources, home cogeneration systems, portable power generators, and the like. Such a polymer electrolyte fuel cell comprises at least a membrane electrode assembly in which a gas diffusion electrode in which an electrode catalyst layer and a gas diffusion layer are laminated is bonded to both surfaces of an electrolyte membrane. The electrolyte membrane here is a material having a strongly acidic group such as a sulfonic acid group or a carboxylic acid group in a polymer chain and having the property of selectively allowing protons to pass.

In fuel cell vehicle applications, a polymer electrolyte membrane is used in an environment in which the amount of water changes greatly and heated to about 80° C., due to accelerator work during acceleration and deceleration. At this time, the dimensional change of the polymer electrolyte membrane due to water swelling and drying shrinkage is very large, and there is room for improvement in terms of durability and reliability. Accordingly, in order to decrease the dimensional change, various methods for embedding a reinforcing material in an electrolyte are proposed. In recent years, in these fuel cell vehicle applications, chemical durability and physical durability and power generation performance in a more severe fuel cell driving environment in the vicinity of 120° C. have been required. As the effects of operation in this high temperature environment, being able to halve the volume of the radiator to allow mounting in a small car, the reduction of catalyst poisoning by CO in the fuel gas, and an increase in heat utilization can be expected. In addition, in use as a fuel cell, the membrane resistance of an electrolyte membrane itself needs to be lowered, and for this, the thickness of the electrolyte membrane is desirably as thin as possible. However, when the thickness of the electrolyte membrane is excessively decreased, there are the problem of physical strength decrease in which pinholes are formed during membrane formation, and the membrane tears during electrode processing, and the problem of a short circuit between electrodes being likely to occur.

In a severe environment at 120° C., unlike 80° C. which is driving environment temperature for conventional fuel cells, extremely large repeated stress of water swelling and drying shrinkage is applied to an electrolyte membrane. Thus, in an electrolyte membrane used in such an environment, durability for both humidification and swelling and drying and thermal deformation stress needs to be improved. Particularly, when some external stress is applied to an electrolyte membrane under heating, stress strain is accumulated, and permanent deformation occurs due to the stress, and the progress of film thinning and the deterioration of the polymer are promoted. In order to inhibit these, in addition to improving the thermal deformation resistance of the electrolyte membrane itself, containing a reinforcing material having a high glass transition temperature is effective. However, when the content of the reinforcing material is increased, the harmful effects of hindering proton conductivity and increasing membrane resistance are caused. Thus, rather than only relying on the reinforcing material having a high glass transition temperature, it is required to also improve the heat resistance of the electrolyte membrane itself and achieve both the durability and high proton conductivity of the electrolyte membrane.

For example, Patent Document 1 describes comprising an electrolyte membrane having a first proton-conducting polymer strengthened by a nanofiber sheet, the nanofiber sheet being made of nanofibers comprising a fiber material selected from polymers and polymer blends, the fiber material being able to comprise a highly fluorinated polymer, a perfluorinated polymer, a hydrocarbon polymer, and a blend and a combination thereof. In a form in Examples disclosed in Patent Document 1, a nanofiber sheet is subjected to calendering treatment at 140° C. Thus, the effect of improving the strength of the nanofiber sheet is achieved, but on the other hand, the harmful effect of decreasing the film thickness and porosity of the nanofiber sheet is produced. When the nanofiber sheet in this form is used as a reinforcing material, void defects in which filling with an electrolyte is insufficient are formed when the nanofiber sheet is combined with the electrolyte. This is because due to the calendering treatment of the nanofiber sheet, not only does the porosity decrease, but portions in which the nanofiber fibers overlap each other and sometimes bind to each other form. Due to these fiber overlap portions, when a solution comprising an electrolyte is applied, and the solvent is evaporated for drying, the nanofibers are less likely to follow and deform, causing poor filling with the electrolyte. Cavity portions formed due to poor filling with the electrolyte greatly increase membrane resistance, and therefore the electrolyte membrane having such cavities is not suitable as an electrolyte membrane for a polymer electrolyte fuel cell. Also when the porosity of the nanofiber sheet is low, the ratio of the electrolyte having proton conductivity in the electrolyte membrane decreases, and the resistance in the film thickness direction is likely to increase. In other words, a problem remains in achieving both the inhibition of dimensional change and sufficient proton conductivity.

In Patent Document 2, it is stated that when a resin-forming material is formed from a resin-forming material liquid using a fiber assembly having a thickness larger than the desired thickness of a resin-reinforced body, the thickness of the fiber assembly is decreased, and therefore in the thickness direction of the resin-reinforced body, the portion in which fibers are present can be increased, and the portion in which no fibers are present can be decreased. Due to this, a resin-reinforced body excellent in mechanical strength and less likely to break can be produced. Patent Document 2 discloses that a polymer electrolyte-reinforced membrane obtained by this method is excellent in mechanical strength and less likely to break. When the electrolyte membrane has such a structural form, the effect of inhibiting dimensional change in the thickness direction is certainly obtained. However, the structure in which the resin-reinforced body is present in the entire electrolyte membrane in this manner is a structure in which internal strain is likely to accumulate in the entire region of the membrane, and has two problems. The first problem is that when the electrolyte membrane is a thin film of 20 μm or less, internal stress strain is likely to be accumulated, and therefore, on the contrary, the durability for humidification and swelling decreases. The second problem is that as a result of inhibiting swelling in all directions, the water content of the entire composite polymer electrolyte membrane decreases, and the proton conductivity under low humidification decreases.

Patent Document 3 discloses a composite solid polymer electrolyte membrane (SPEM) comprising a porous polymer substrate in which an ion-conducting substance is interpenetrated, the SPEM being substantially thermally stable to a temperature of at least about 100° C. The thermally stable electrolyte membrane in Patent Document 3 is allegedly "thermally stable, and stable to hydrolysis, at a temperature of 100° C." as preferred embodiments of the porous polymer substrate and the ion-conducting material. In other words, the disclosure of Patent Document 3 is only the disclosure of a composite solid polymer in which weight decrease due to the hydrolysis of the polymer is small, and problems for achieving both the inhibition of dimensional change and sufficient proton conductivity at 110° C. or more remain.

Patent Document 4 discloses a composite polymer ion exchange membrane, the composite polymer ion exchange membrane having surfaces opposite to each other and comprising (a) a porous nonwoven web material comprising non-conducting non-compacted polymer fibers, and (b) at least one type of ion exchange polymer having a substantially equal volume fraction over the entire composite membrane and impregnated between the surfaces of the composite membrane opposite to each other so that the volume fraction between the surfaces opposite to each other exceeds 50 percent. The "non-compacted" in the "porous nonwoven web comprising non-conducting non-compacted polymer fibers" means that after the production of the web material, the web material is not compressed, for example, by calendering or by fixing or melting and fusing the polymer fibers each other. The "calendering" is the process of compressing the web material by passing the web through the nip between two rolls, or the like. Such rolls may be in contact with each other, or a constant or variable gap may be present between the roll surfaces. The "non-compacted" in Patent Document 4 may include light calendering at room temperature and more preferably does not include calendering. Allegedly, the nip roll pressure at which light calendering is performed at this time may be on the order of less than about 200 pounds/linear inch or less than about 100 pounds/linear inch. However, in the porous nonwoven web material in this form, handling is difficult, there is a drawback in self-supporting properties, and the strength of the web sheet is low strength, and therefore the basis weight weighing of the porous nonwoven web needs to be increased. As a result, the problem of thinning the polymer electrolyte-reinforced membrane being difficult to increase membrane resistance remains, and ensuring a porosity of 75% or more is difficult, and the problem of the inhibition of void defects due to poor filling with the electrolyte, and dimensional change at 110° C. or more remains as in Patent Document 1.

CITATION LIST

Patent Document

Patent Document 1: Japanese Patent No. 5798186
Patent Document 2: Japanese Patent Laid-Open No. 20016-58152
Patent Document 3: National Publication of International Patent Application No. 2003-528420
Patent Document 4: National Publication of International Patent Application No. 2014-525115

SUMMARY OF INVENTION

Technical Problem

The present invention has been made in view of the above circumstances, and it is an object of the present invention to provide a composite polymer electrolyte membrane in which poor filling of a reinforcing material with an electrolyte is inhibited and which has few void defects and low resistance, and has high durability in a fuel cell operation environment at a high temperature exceeding 110° C.

Solution to Problem

The present inventors have studied diligently in order to achieve the above object, and as a result found that a composite polymer electrolyte membrane which comprises a predetermined reinforcing material and in which the average coefficient of linear expansion from 20° C. to 120° C. in the in-plane direction of the electrolyte membrane is in a predetermined range achieves the above object, and completed the present invention. Specifically, the present invention is as follows.

(1) A composite polymer electrolyte membrane comprising a nanofiber sheet having a basis weight of 1.5 g/m$^2$ or more and 4.0 g/m$^2$ or less, and a proton-conducting polymer, the electrolyte membrane having a sheet shape in which the proton-conducting polymer and the nanofiber sheet are combined, and having an average coefficient of linear expansion of 300 ppm/K or less from 20° C. to 120° C. in an in-plane direction of the sheet shape.

(2) The electrolyte membrane according to (1), wherein an average coefficient of linear expansion of the nanofiber sheet from 20° C. to 120° C. in an in-plane direction is 250 ppm/K or less.

(3) The electrolyte membrane according to (1) or (2), wherein an average coefficient of linear expansion from 20° C. to 120° C. in an in-plane direction of a sheet shape having a thickness of 15 μm is 1550 ppm/K or less when the proton-conducting polymer is processed so as to have the sheet shape having a thickness of 15 μm.

(4) The electrolyte membrane according to any one of (1) to (3), wherein a porosity (%) of the nanofiber sheet is 75% or more and 90% or less, a film thickness of the nanofiber sheet in the electrolyte membrane shrinks in a range of 50% or more and 75% or less compared with film thickness before impregnation with the proton-conducting polymer, and a ratio of a thickness of the nanofiber sheet to a thickness of the electrolyte membrane is 25% or more and less than 60%.

(5) The electrolyte membrane according to any one of (1) to (4), wherein the nanofiber sheet comprises one or more selected from the group consisting of polyethersulfone, polybenzimidazole, and polyimide.

(6) The electrolyte membrane according to any one of (1) to (5), wherein an average fiber diameter of fibers in the nanofiber sheet is 100 nm or more and 500 nm or less, and a thickness of the nanofiber sheet before impregnation with the proton-conducting polymer is 8 μm or more and 28 μm or less.

(7) The electrolyte membrane according to any one of (1) to (6), wherein an average coefficient of linear expansion of the nanofiber sheet from 20° C. to 120° C. in an in-plane direction is 200 ppm/K or less, and an average coefficient of linear expansion from 20° C. to 120° C. in an in-plane direction of a sheet shape having a thickness of 15 μm is 1550 ppm/K or less when the proton-conducting polymer is processed so as to have the sheet shape having a thickness of 15 μm.

(8) A composite polymer electrolyte membrane comprising a nanofiber sheet and a proton-conducting polymer, the electrolyte membrane having a sheet shape in which the proton-conducting polymer and the nanofiber sheet are combined, and having an average coefficient of linear expansion of 350 ppm/K or less from 20° C. to 150° C. in an in-plane direction of the sheet shape.

(9) A composite polymer electrolyte membrane comprising a nanofiber sheet having a basis weight of 1.5 g/m² or more and 4.0 g/m² or less, and a proton-conducting polymer, the electrolyte membrane having a sheet shape in which the proton-conducting polymer and the nanofiber sheet are combined, the proton-conducting polymer having a sheet shape, an average coefficient of linear expansion of the nanofiber sheet from 20° C. to 120° C. in an in-plane direction being 250 ppm/K or less, and an average coefficient of linear expansion from 20° C. to 120° C. in an in-plane direction of a sheet shape having a thickness of 15 μm being 1550 ppm/K or less when the proton-conducting polymer is processed so as to have the sheet shape having a thickness of 15 μm.

Advantageous Effects of Invention

According to the present invention, it is possible to provide a composite polymer electrolyte membrane in which poor filling of a reinforcing material with an electrolyte is inhibited and which has few void defects and low resistance, and has high durability in a fuel cell operation environment at a high temperature exceeding 110° C.

BRIEF DESCRIPTION OF DRAWINGS

FIG. 1 is a schematic diagram for explaining one example of the mode of use of the composite polymer electrolyte membrane in this embodiment.

FIG. 2 is a schematic diagram for explaining the mode of combination according to this embodiment.

FIG. 3 is an SEM photograph showing a surface of a nanofiber sheet used in an Example.

FIG. 4 is an SEM photograph showing a cross section of a composite polymer electrolyte membrane in another Example.

FIG. 5 is an SEM photograph showing a cross section of a composite polymer electrolyte membrane in a Comparative Example.

DESCRIPTION OF EMBODIMENTS

An embodiment for carrying out the present invention (hereinafter simply referred to as "this embodiment") will be described in detail below with reference to the drawings as needed, but the present invention is not limited to this embodiment described below. Various modifications can be made in the present invention without departing from the spirit thereof. One mode of the composite polymer electrolyte membrane in this embodiment (hereinafter also simply referred to as an "electrolyte membrane") is an electrolyte membrane comprising a nanofiber sheet and a proton-conducting polymer, and the electrolyte membrane has a sheet shape in which the proton-conducting polymer and the nanofiber sheet are combined, and has an average coefficient of linear expansion of 300 ppm/K or less from 20° C. to 120° C. in the in-plane direction of the sheet shape, more preferably has an average coefficient of linear expansion of 350 ppm/K or less from 20° C. to 150° C. in the in-plane direction of the sheet shape. Alternatively, another mode of the electrolyte membrane in this embodiment is an electrolyte membrane comprising a nanofiber sheet and a proton-conducting polymer, and the electrolyte membrane has a sheet shape in which the proton-conducting polymer and the nanofiber sheet are combined, and the proton-conducting polymer has a sheet shape, the average coefficient of linear expansion of the nanofiber sheet from 20° C. to 120° C. in the in-plane direction is 250 ppm/K or less, and the average coefficient of linear expansion from 20° C. to 120° C. in the in-plane direction of a sheet shape having a thickness of 15 μm is 1550 ppm/K or less when the proton-conducting polymer is processed so as to have the sheet shape having a thickness of 15 μm.

<Nanofiber Sheet>

The nanofiber sheet in this embodiment functions as a reinforcing material that strengthens the electrolyte membrane. The nanofiber sheet in this embodiment preferably has a porosity (%) of 75% or more and 95% or less, more preferably 75% or more and 90% or less, and further preferably 80% or more and 88% or less. In addition, it is preferred that the film thickness of the nanofiber sheet in this embodiment shrinks in the range of 50% or more and 75% or less, compared with the film thickness before combination with the proton-conducting polymer, that is, when the nanofiber sheet is combined with the proton-conducting polymer. Further, in the electrolyte membrane in this embodiment, the ratio of the thickness of the nanofiber sheet to the thickness of the electrolyte membrane is preferably 25% or more and less than 60%. Due to these, the electrolyte is better in filling-up properties, that is, the filling properties of the proton-conducting polymer into the cavities in the nanofiber sheet, the membrane resistance is smaller, and higher proton conductivity and better inhibition of dimensional change in the in-plane direction can be achieved.

When the porosity is 75% or more, poor filling up of the nanofiber sheet with the proton-conducting polymer can be more inhibited. On the other hand, when the porosity is 95% or less, more preferably 90% or less, the self-supporting properties of the nanofiber sheet improve, and therefore handling is simple, and the reinforcing action of the nanofiber sheet also tends to be more sufficient. The porosity is derived as follows. First, the mass of the nanofiber sheet cut into a 40 mm×30 mm rectangle is measured by a precision balance, and from the measured mass and the thickness of the nanofiber sheet, the film density ρ (g/cm³) is calculated by the following formula (A). Then, from the obtained film density ρ and the true density of the material constituting the nanofiber sheet, $\rho_0$, (g/cm³), the porosity (%) can be obtained by the following formula (B).

$$\text{film density } \rho = M/(4.0 \times 3.0 \times t) \quad (A)$$

wherein M represents the mass (g) of the cut nanofiber sheet, and t represents the thickness (cm) of the nanofiber sheet.

$$\text{porosity } (\%) = (1-(\rho/\rho_0)) \times 100 \quad (B)$$

The basis weight of the nanofiber sheet is 1.5 g/m² or more and 4.0 g/m² or less, preferably 2.0 g/m² or more and 3.5 g/m² or less, and more preferably 2.5 g/m² or more and 3.3 g/m² or less. When the basis weight is 1.5 g/m² or more, the film has self-supporting properties, and the film does not tear in combination, and handling is easy, and the process stabilizes. Further, the number of fibers per unit area is also sufficient, and therefore the swelling and shrinkage of the electrolyte membrane in the in-plane direction is inhibited.

On the other hand, when the basis weight is 4.0 g/m² or less, the filling properties of the polymer are better, and both proton resistance and the swelling and shrinkage of the electrolyte membrane can be inhibited. The basis weight of the nanofiber sheet is a value obtained by measuring the area and mass of any surface having the largest area that can be sampled, and converting them into mass per m². The thickness of the nanofiber sheet is derived as follows. The thickness is measured at any five points in the same nanofiber sheet using a film thickness meter (for example, ABS Digimatic Indicator ID-F125 (product name) manufactured by Mitutoyo Corporation), and the arithmetic mean is taken as the thickness of the nanofiber sheet.

The change in thickness before and after the combination of the nanofiber sheet and the proton-conducting polymer, in other words, the extent of the shrinkage of thickness when the nanofiber sheet is combined with the proton-conducting polymer, can be measured by obtaining a cross-sectional SEM image of the electrolyte membrane. First, the thickness of the nanofiber sheet before combination with the proton-conducting polymer is derived as described above. Then, the electrolyte membrane in this embodiment is made using the nanofiber sheet. Next, a cross-sectional SEM image of the electrolyte membrane is obtained, and the thickness of the nanofiber sheet in the thickness direction of the electrolyte membrane is measured by the contrast difference from the proton-conducting polymer. For pretreatment at this time, first, the electrolyte membrane is cut into an appropriate size, the cut sample is embedded in an epoxy resin, and then a cut cross section is made by an ultramicrotome with a cryocooling function. Next, the portion of the nanofiber sheet is stained by ruthenium staining, followed by further osmium coating to make a microscopic examination sample. Due to this pretreatment, the thickness of the nanofiber sheet in the composite polymer electrolyte membrane can be easily measured.

The thickness of the nanofiber sheet in this embodiment before combination with the proton-conducting polymer is preferably 8 μm or more and 28 μm or less. When the thickness is 8 μm or more and 28 μm or less, the filling-up properties of the proton-conducting polymer are better even in the case of a thin film (for example, a thickness of 25 μm or less) electrolyte membrane, particularly when the average fiber diameter of the fibers in the nanofiber sheet is 100 nm or more and 500 nm or less. As a result, the dimensional change of the electrolyte membrane in the in-plane direction can be more effectively and reliably inhibited.

The nanofiber sheet in this embodiment preferably has an average coefficient of linear expansion of 250 ppm/K or less, more preferably 200 ppm/K or less, further preferably 150 ppm/K or less, still further preferably 100 ppm/K or less, and particularly preferably 60 ppm/K or less from 20° C. to 120° C. in the in-plane direction. When the average coefficient of linear expansion of the nanofiber sheet is 250 ppm/K or less, a composite polymer electrolyte membrane in which the durability is better and dimensional change in the in-plane direction can be further inhibited even under a harsh environment at 120° C. is formed when the nanofiber sheet is combined with the proton-conducting polymer. The lower limit value of the average coefficient of linear expansion of the nanofiber sheet from 20° C. to 120° C. is not particularly limited and may be 5 ppm/K or more, 10 ppm/K or more, or 30 ppm/K or more.

The nanofiber sheet in this embodiment comprises, for example, one or more selected from the group consisting of polyolefin resins (for example, polyethylene, polypropylene, and polymethylpentene), styrene resins (for example, polystyrene), polyester resins (for example, polyethylene terephthalate, polytrimethylene terephthalate, polybutylene terephthalate, polyethylene naphthalate, polybutylene naphthalate, polycarbonate, polyarylate, and wholly aromatic polyester resins), acrylic resins (for example, polyacrylonitrile, polymethacrylic acid, polyacrylic acid, and polymethyl methacrylate), polyamide resins (for example, 6 nylon, 66 nylon, and aromatic polyamide resins), polyether resins (for example, polyetheretherketone, polyacetal, polyphenylene ether, modified polyphenylene ether, and aromatic polyetherketone), urethane resins, chlorine resins (for example, polyvinyl chloride and polyvinylidene chloride), fluorine resins (for example, polytetrafluoroethylene and polyvinylidene fluoride (PVDF)), polyphenylene sulfide (PPS), polyamide-imide resins, polyimide resins (PI), polyetherimide resins, aromatic polyetheramide resins, polysulfone resins (for example, polysulfone and polyethersulfone (PES)), polyazole resins (for example, polybenzimidazole (PBI), polybenzoxazole, polybenzothiazole, and polypyrrole), cellulose resins, and polyvinyl alcohol resins.

A nanofiber sheet comprising one or more selected from the group consisting of polyethersulfone (PES), polybenzimidazole (PBI), polyimide (PI), and polyphenylene sulfide (PPS) among them has a low average coefficient of linear expansion and therefore is preferred. From the same viewpoint, particularly, a nanofiber sheet comprising one or more selected from the group consisting of PES, PBI, and PI is more preferred. Such a nanofiber sheet is better in chemical resistance and heat resistance, and is more stable when combined with the proton-conducting polymer.

Such a nanofiber sheet can be produced, for example, by an electrostatic spinning method (electrospinning method), a melt blowing method, and a spunbonding method. Among these, the electrostatic spinning method is preferably used because it is also possible to continuously produce a wide nanofiber sheet having a small average fiber diameter, comprising substantially continuous fibers, having a large porosity, and exceeding 1 M. As the mass production apparatus for producing the nanofiber sheet, for example, "Nanospider" (trade name) NS8S1600U (model name, wire electrode type) manufactured by Elmarco, EDEN (NF-1001S) (product name, nozzle discharge electrode type) from MEC COMPANY LTD., and an Esprayer mass production machine (nozzle discharge electrode type) from Fuence Co., Ltd. can be preferably used. Nanofibers of PPS, to which it is difficult to apply the electrostatic spinning method, can be processed, for example, with reference to Japanese Patent Laid-Open No. 2013-79486.

The fibers of the nanofiber sheet according to the electrostatic spinning method in this embodiment can be processed to the desired nanofiber fiber diameter by a combination of a plurality of conditions such as the applied voltage of the above apparatus, the distance between electrodes, temperature, humidity, the type of the solvent of the spinning solution, and spinning solution concentration. The average fiber diameter of the fibers in the nanofiber sheet in this embodiment is preferably 100 nm or more and 500 nm or less, more preferably 100 nm or more and 350 nm or less. When the average fiber diameter is within the above range, the filling-up properties of the proton-conducting polymer are good even in the case of a thin film (for example, a thickness of 25 μm or less) composite polymer electrolyte membrane, particularly when the thickness of the nanofiber sheet before combination is 8 μm or more and 28 μm or less. As a result, the dimensional change of the electrolyte membrane in the in-plane direction can be more effectively and reliably inhibited.

When the fiber diameters of the fibers in the nanofiber sheet are compared at an equivalent basis weight, a smaller diameter can decrease the diameter of the pores surrounded by the nanofiber fibers. Thus, the regions of the proton-conducting polymer alone in which the nanofibers are not present can be reduced, and therefore the dimensional change of the electrolyte membrane in the in-plane direction can be more inhibited. However, in actuality, when the fiber diameter is less than 100 nm, the productivity decreases, and the cost increase and the degree of difficulty in processing also increase, and ensuring the uniformity of the nanofiber sheet fibers (variations in fiber diameter, the basis weight, and the porosity) tends to be difficult. On the other hand, when the fiber diameter exceeds 500 nm, film thickness shrinkage tends to be insufficient at sites where the fibers overlap each other, and the filling-up properties of the proton-conducting polymer, which is an electrolyte, decrease, and the occurrence of void defects is likely to occur, and the membrane resistance tends to increase. In addition, when the fiber diameter exceeds 500 nm, the diameter of the pores between the nanofiber fibers (the cavity portions in which the fibers are not present) tends to become large, and the regions in which the proton-conducting polymer is present alone tend to become large. As a result, the dimensional change of the electrolyte membrane in the in-plane direction tends to be difficult to inhibit.

The nanofiber sheet in this embodiment is preferably subjected to heat treatment before combination. Examples of the heat treatment method include heating by hot air drying using an infrared heater or an oven. According to this heat treatment method, the nanofiber fibers can be fused at points where the nanofiber fibers are in partial contact with each other, with the high porosity of the nanofiber sheet maintained. As a result, further inhibition of the fluffing of the nanofiber sheet surface and further improvement of sheet strength are made possible.

Of these, the improvement of the strength of the nanofiber sheet can be confirmed by stress at 5% elongation by a tensile test. In other words, the stress at 5% elongation of the nanofiber sheet in this embodiment is preferably 1.5 MPa or more, more preferably 2 MPa or more, and further preferably 3 MPa or more in a state in which a porosity of 75% or more is maintained. When the stress at 5% elongation of the nanofiber sheet is 1.5 MPa or more, the effect of inhibiting dimensional change during humidification and swelling and the durability tend to improve further as the composite polymer electrolyte membrane. In addition, the thermomechanical properties of the nanofiber sheet are better, and the nanofiber sheet is less likely to thermally deform even under high temperature. The thermomechanical properties can be measured by a stress-strain control apparatus for thermomechanical analysis (TMA). The nanofiber sheet is heated under constant stress, and superiority or inferiority can be determined by the amount of deformation at this time. In the combination of a nanofiber sheet having higher strength and moreover better in thermomechanical properties into an electrolyte membrane, the content in the electrolyte membrane can be made low. As a result, the membrane resistance can be reduced, and the occurrence of void defects in impregnation with the electrolyte can be inhibited. The stress at 5% elongation of the nanofiber sheet is measured in accordance with a method described in Examples.

The average coefficient of linear expansion of this nanofiber sheet can be measured by a stress-strain control apparatus for thermomechanical analysis (TMA). In more detail, the nanofiber sheet is mounted on a probe and heated at a constant heating rate under a constant load in a tensile mode, and the average coefficient of linear expansion is calculated by the displacement of sample length (thermal expansion) at this time. The nanofiber sheet in this embodiment preferably has an average coefficient of linear expansion of 250 ppm/K or less from 20° C. to 120° C. in the in-plane direction of the sheet shape (hereinafter also simply referred to as a "sheet in-plane direction"). Here, the in-plane direction of the sheet shape refers to both directions, the machine direction (MD) and the direction orthogonal to MD, the transverse direction (TD). When this average coefficient of linear expansion is 250 ppm/K or less, the nanofiber sheet can be said to be a reinforcing material for an electrolyte better in heat resistance, stronger in creep deformation, and further preferred for the inhibition of dimensional change. Particularly, when the average coefficient of linear expansion from 20° C. to 120° C. in the sheet in-plane direction is preferably 250 ppm/K or less, more preferably 200 ppm/K or less, further preferably 150 ppm/K or less, still further preferably 100 ppm/K or less, and particularly preferably 60 ppm/K or less, a reinforcing material for an electrolyte membrane better in heat resistance, stronger in creep deformation, and further preferred for the inhibition of dimensional change, even under an extremely harsh operation environment exceeding 120° C. is provided.

<Composite Polymer Electrolyte Membrane>

The composite polymer electrolyte membrane in this embodiment comprises the above nanofiber sheet and the proton-conducting polymer, which is a polymer electrolyte. The method for producing the composite polymer electrolyte membrane in this embodiment is not particularly limited, and, for example, the composite polymer electrolyte membrane can be obtained by filling the above nanofiber sheet with the electrolyte. A schematic diagram for explaining one example of the mode of use of the composite electrolyte membrane in this embodiment is shown in FIG. 1. As shown in FIG. 1, a nanofiber sheet 1 in this embodiment can be formed by laminating an electrode catalyst layer 2, a proton-conducting polymer 3, which is an electrolyte, the nanofiber sheet 1, the electrolyte 3, and an electrode catalyst layer 2 in this order. FIG. 2 is a cross-sectional schematic diagram when the nanofiber sheet and the proton-conducting polymer are combined. As shown in FIG. 2, the nanofiber sheet 1 is combined with the proton-conducting polymer 3, and its void portions are filled with the proton-conducting polymer 3.

The average coefficient of linear expansion of this electrolyte membrane can be measured by a stress-strain control apparatus for thermomechanical analysis (TMA). In more detail, an electrolyte membrane sample is mounted on a probe and heated at a constant heating rate under a constant load in a tensile mode, and the average coefficient of linear expansion is calculated by the displacement of sample length (thermal expansion) at this time. The electrolyte membrane in this embodiment preferably has a sheet shape in which the proton-conducting polymer and the nanofiber sheet are combined, and has an average coefficient of linear expansion of 300 ppm/K or less from 20° C. to 120° C. in the in-plane direction of the sheet shape (hereinafter also simply referred to as a "sheet in-plane direction"). Here, the in-plane direction of the sheet shape refers to both directions, the machine direction (MD) and the direction orthogonal to MD, the transverse direction (TD). When this average coefficient of linear expansion is 300 ppm/K or less, the electrolyte membrane is better in heat resistance, stronger in creep deformation, and difficult to further thin even by an external load, and therefore can be said to be a composite more preferred for the inhibition of dimensional change.

Particularly, the average coefficient of linear expansion from 20° C. to 150° C. in the sheet in-plane direction is preferably 400 ppm/K or less, more preferably 350 ppm/K or less. In this case, the electrolyte membrane is better in heat resistance, stronger in creep deformation, and difficult to further thin even by an external load, even under an extremely harsh operation environment exceeding 120° C., and therefore is a composite further preferred for the inhibition of dimensional change. From the same viewpoint, the average coefficient of linear expansion from 20° C. to 150° C. in the sheet in-plane direction is further preferably 300 ppm/K or less, still more preferably 250 ppm/K or less, still further preferably 150 ppm/K or less, and particularly preferably 100 ppm/K or less.

Examples of the method for adjusting the average coefficient of linear expansion of the electrolyte membrane within the above range include controlling the molecular structure and molecular weight of the proton-conducting polymer so that it has high heat resistance, and combining the highly heat-resistant proton-conducting polymer and the nanofiber sheet.

In this embodiment, the thickness of the electrolyte membrane is preferably 1 μm or more and 300 μm or less, more preferably 2 μm or more and 100 μm or less, further preferably 5 μm or more and 50 μm or less, and particularly preferably 5 μm or more and 25 μm or less. By adjusting the thickness of the electrolyte membrane in the above range, inconveniences such as the direct reaction of hydrogen and oxygen can be reduced. As a result, damage to the membrane, or the like tends to be less likely to occur even if differential pressure, strain, or the like occurs in handling during fuel cell production, or during fuel cell operation. Further, also from the viewpoint of maintaining the ion permeability of the electrolyte membrane better, and more effectively and reliably maintaining performance as the electrolyte membrane, adjusting the thickness in the above range is preferred.

The above proton-conducting polymer, which is an electrolyte, is not particularly limited, and examples thereof include perfluorocarbon polymer compounds having ion exchange groups, and hydrocarbon polymer compounds having aromatic rings in the molecules into which ion exchange groups are introduced. One of these is used alone, or two or more of these are used in combination. Among these, perfluorocarbon polymer compounds having ion exchange groups are preferred from the viewpoint of better chemical stability.

The ion exchange capacity of the proton-conducting polymer is preferably 0.5 meq/g or more and 3.0 meq/g or less, more preferably 0.65 meq/g or more and 2.0 meq/g or less, and further preferably 0.8 meq/g or more and 1.5 meq/g or less. When the ion exchange equivalent is 3.0 meq/g or less, the swelling of the electrolyte membrane under high temperature and high humidification during fuel cell operation tends to be more reduced in utilization as the electrolyte membrane. When the swelling is reduced in this manner, problems such as a decrease in the strength of the electrolyte membrane, and wrinkling occurring to cause peeling from the electrode, and further the problem of a decrease in gas blocking properties tend to be able to be reduced. When the ion exchange capacity is 0.5 meq/g or more, the power generation capacity of a fuel cell comprising the obtained electrolyte membrane tends to improve more.

The ion exchange capacity can be obtained by the following method. The electrolyte membrane (having a sheet area of approximately 2 cm² or more and 20 cm² or less) in which the counterion of the ion exchange group is in the state of a proton is immersed in 30 mL of a saturated NaCl aqueous solution at 25° C., and allowed to stand for 30 minutes with stirring. Then, the protons in the saturated NaCl aqueous solution are subjected to neutralization titration with phenolphthalein as an indicator using a 0.01 N sodium hydroxide aqueous solution. The electrolyte membrane in which the counterion of the ion exchange group is in the state of a sodium ion, obtained after neutralization is rinsed with pure water, further vacuum-dried, and weighed. The equivalent weight EW (g/eq) is obtained by the following formula (C) with the amount of substance of sodium hydroxide required for neutralization being M (mmol), and the weight of the electrolyte membrane in which the counterion of the ion exchange group is a sodium ion being W (mg).

$$EW=(W/M)-22 \tag{C}$$

Further, the reciprocal of the value of the obtained EW is taken and increased 1000 times to calculate the ion exchange capacity (meq/g).

The ion exchange group is not particularly limited, and examples thereof include a sulfonic acid group, a sulfonimide group, a sulfonamide group, a carboxylic acid group, and a phosphoric acid group. The ion exchange group is preferably a sulfonic acid group among them. One ion exchange group is used alone, or two or more ion exchange groups are used in combination.

The hydrocarbon polymer compounds having aromatic rings in the molecules are not particularly limited, and examples thereof include polyphenylene sulfide, polyphenylene ether, polysulfone, polyethersulfone, polyetherethersulfone, polyetherketone, polyetheretherketone, polythioetherethersulfone, polythioetherketone, polythioetheretherketone, polybenzimidazole, polybenzoxazole, polyoxadiazole, polybenzoxazinone, polyxylylene, polyphenylene, polythiophene, polypyrrole, polyaniline, polyacene, polycyanogen, polynaphthyridine, polyphenylene sulfide sulfone, polyphenylene sulfone, polyimide, polyetherimide, polyesterimide, polyamide-imide, polyarylate, aromatic polyamide, polystyrene, polyester, and polycarbonate. One of these is used alone, or two or more of these are used in combination.

The perfluorocarbon polymer compounds having ion exchange groups better in chemical stability are not particularly limited, and examples thereof include perfluorocarbon sulfonic acid resins, perfluorocarbon carboxylic acid resins, perfluorocarbon sulfonimide resins, perfluorocarbon sulfonamide resins, and perfluorocarbon phosphoric acid resins, and amine salts and metal salts of these resins. One of these is used alone, or two or more of these are used in combination.

The perfluorocarbon polymer compounds are not particularly limited, and more specific examples include polymers represented by the following formula [1]:

—[CF$_2$CX$^1$X$^2$]$_a$—[CF$_2$—CF(—O—(CF$_2$—CF(CF$_2$X$^3$))$_b$—O$_c$—(CFR$^1$)$_d$—(CFR$^2$)$_e$—(CF$_2$)$_f$—X$^4$)]$_g$— [1]

wherein $X^1$, $X^2$, and $X^3$ each independently represent a halogen atom or a perfluoroalkyl group having 1 or more and 3 or less carbon atoms. a and g satisfy 0≤a<1, 0<g<1, and a+g=1. b is an integer of 0 or more and 8 or less. c is 0 or 1. d and e are mutually independently integers of 0 or more and 6 or less, and f is an integer of 0 or more and 10 or less, provided that d+e+f is not equal to 0. $R^1$ and $R^2$ mutually independently represent a halogen atom, or a perfluoroalkyl group or a fluorochloroalkyl group having 1 or more and 10 or less carbon atoms. $X^4$ represents COOZ, $SO_3Z$, $PO_3Z_2$, or $PO_3HZ$, wherein Z represents a hydrogen atom, an alkali metal atom, an alkaline earth metal atom, or an amine ($NH_4$, $NH_3R^3$, $NH_2R^3R^4$, $NHR^3R^4R^5$, or $NR^3R^4R^5R^6$). $R^3$, $R^4$, $R^5$, and $R^6$ each independently represent an alkyl group or an arene group.

Among these, perfluorocarbon sulfonic acid resins represented by the following formula [2] or formula [3], or metal salts thereof are preferred.

$$—[CF_2CF_2]_a—[CF_2—CF(—O—(CF_2—CF(CF_3))_b—O—(CF_2)_c—SO_3X)]_d— \quad [2]$$

wherein a and d satisfy $0 \le a < 1$, $0 \le d < 1$, and $a+d=1$. b is an integer of 1 or more and 8 or less. c is an integer of 0 or more and 10 or less. X represents a hydrogen atom or an alkali metal atom.

$$—[CF_2CF_2]_e—[CF_2—CF(—O—(CF_2)_f—SO_3Y)]_g— \quad [3]$$

wherein e and g satisfy $0 \le e < 1$, $0 \le g < 1$, and $e+g=1$. f is an integer of 0 or more and 10 or less. Y represents a hydrogen atom or an alkali metal atom.

Among the above perfluorocarbon polymer compounds, the perfluorocarbon polymer compounds represented by the above formula [3] are preferred because they are better in heat resistance, and the amount of the ion exchange group introduced can be further increased.

The perfluorocarbon polymer compounds having ion exchange groups that can be used in this embodiment can be produced, for example, by polymerizing a precursor polymer represented by the following formula [4], followed by alkali hydrolysis, acid treatment, and the like, which is not particularly limited.

$$—[CF_2CX^1X^2]_a—[CF_2—CF(—O—(CF_2—CF(CF_2X^3))_b—O_c—(CFR^1)_d—(CFR^2)_e—(CF_2)_f—X^5)]_g— \quad [4]$$

wherein $X^1$, $X^2$, and $X^3$ each independently represent a halogen atom or a perfluoroalkyl group having 1 or more and 3 or less carbon atoms. a and g satisfy $0 \le a < 1$, $0 < g \le 1$, and $a+g=1$. b is an integer of 0 or more and 8 or less. c is 0 or 1. d and e are mutually independently integers of 0 or more and 6 or less, and f is an integer of 0 or more and 10 or less, provided that $d+e+f$ is not equal to 0. $R^1$ and $R^2$ mutually independently represent a halogen atom, or a perfluoroalkyl group or a fluorochloroalkyl group having 1 or more and 10 or less carbon atoms. $X^5$ represents $COOR^7$, $COR^8$, or $SO_2R^8$, wherein $R^7$ represents an alkyl group having 1 to 3 carbon atoms. $R^8$ represents a halogen element.

The above precursor polymer can be produced, for example, by copolymerizing an olefin fluoride compound and a vinyl fluoride compound, which is not particularly limited.

Here, the olefin fluoride compound is not particularly limited, and examples thereof include compounds represented by following formula [5]:

$$CF_2=CFZ \quad [5]$$

wherein Z represents a hydrogen atom, a chlorine atom, a fluorine atom, a perfluoroalkyl group having 1 to 3 carbon atoms, or a cyclic perfluoroalkyl group that may comprise oxygen.

The vinyl fluoride compound is not particularly limited, and examples thereof include compounds shown below:

$$CF_2=CFO(CF_2)_z—SO_2F,$$

$$CF_2=CFOCF_2CF(CF_3)O(CF_2)_z—SO_2F,$$

$$CF_2=CF(CF_2)_z—SO_2F,$$

$$CF_2=CF(OCF_2CF(CF_3))_z—(CF_2)_z—SO_2F,$$

$$CF_2=CFO(CF_2)_z—CO_2R,$$

$$CF_2=CFOCF_2CF(CF_3)O(CF_2)_z—CO_2R,$$

$$CF_2=CF(CF_2)_z—CO_2R,$$

$$CF_2=CF(OCF_2CF(CF_3))_z—(CF_2)_2—CO_2R$$

wherein Z is an integer of 1 to 8, and R represents an alkyl group having 1 to 3 carbon atoms.

In this embodiment, the proton-conducting polymer can be obtained as one having a sheet shape by applying a proton-conducting polymer solution to a glass substrate or a film substrate followed by drying and peeling from the substrate. When the proton-conducting polymer is processed so as to have a sheet shape having a thickness of 15 µm, the proton-conducting polymer having this sheet shape (hereinafter also referred to as a "proton-conducting polymer sheet") preferably has an average coefficient of linear expansion of 1550 ppm/K or less, more preferably 1400 ppm/K or less, and further preferably 1200 ppm/K or less from 20° C. to 120° C. in the in-plane direction. When the average coefficient of linear expansion of the proton-conducting polymer sheet is 1550 ppm/K or less, the composite polymer electrolyte membrane obtained by combination with the nanofiber sheet has better durability even under a harsh environment at 120° C., and dimensional change in the in-plane direction can be further inhibited. The average coefficient of linear expansion of this proton-conducting polymer sheet in the in-plane direction can be measured by a stress-strain control apparatus for thermomechanical analysis (TMA). In more detail, the proton-conducting polymer is mounted on a probe and heated at a constant heating rate under a constant load in a tensile mode, and the average coefficient of linear expansion is calculated by the displacement of sample length (thermal expansion) at this time. The lower limit value of the average coefficient of linear expansion of the proton-conducting polymer sheet in the in-plane direction is not particularly limited and may be 100 ppm/K or more or 300 ppm/K or more.

<Method for Producing Composite Polymer Electrolyte Membrane>

Next, the method for producing the composite polymer electrolyte membrane in this embodiment will be described. The composite polymer electrolyte membrane in this embodiment can be obtained by combining a nanofiber sheet and a proton-conducting polymer, which is a polymer electrolyte, for example, filling cavities in a nanofiber sheet with a proton-conducting polymer.

The method for combining a nanofiber sheet and a proton-conducting polymer is not particularly limited, and examples thereof include a method of applying a proton-conducting polymer solution described later to a nanofiber sheet or impregnating a nanofiber sheet with a proton-conducting polymer solution, followed by drying. More specifically, for example, a film of a proton-conducting polymer solution is formed on a moving or standing elongated casting substrate (sheet), and a nanofiber sheet is brought into contact with the solution to make an uncompleted composite structure. This uncompleted composite structure is dried in a hot air circulation tank or the like. Next, a film of the proton-conducting polymer solution is further formed on the dried uncompleted composite structure, and thus an electrolyte membrane can be made. The contact between the proton-conducting polymer solution and the nanofiber sheet may be performed in a dry state or in an undried state or a wet state. In addition, in the case of contact, pressurization by a rubber roller or air blowing may be performed, or contact may be performed while the tension of the nanofiber sheet is controlled. Further, combination may be performed by previously processed sheets comprising a proton-conducting polymer by extrusion, casting, or the like, and superimposing these sheets on a nanofiber sheet followed by hot pressing.

The electrolyte membrane in this embodiment is preferably further subjected to heat treatment after being produced as described above. Due to this heat treatment, the crystallization of the perfluoroalkyl skeleton of the proton-conducting polymer proceeds, and as a result, the mechanical strength of the electrolyte membrane can be further stabilized. The temperature of this heat treatment is preferably 100° C. or more and 230° C. or less, more preferably 120° C. or more and 220° C. or less, and further preferably 140° C. or more and 200° C. or less. By adjusting the temperature of the heat treatment in the above range, crystallization proceeds sufficiently, and the mechanical strength of the electrolyte membrane improves. Also from the viewpoint of maintaining mechanical strength higher while suitably maintaining the water content of the electrolyte membrane, the above temperature range is preferred. The time of the heat treatment is preferably 5 minutes to 3 hours, more preferably 10 minutes to 2 hours, from the viewpoint of obtaining an electrolyte membrane having higher durability, though it depends on the temperature of the heat treatment.

The proton-conducting polymer solution that can be used when the electrolyte membrane according to this embodiment is produced comprises the above proton-conducting polymer and a solvent, and another additive as needed. This proton-conducting polymer solution is used for combination with a nanofiber sheet, as it is, or after undergoing a step such as filtration or concentration. Alternatively, this solution can also be used alone or by being mixed with another electrolyte solution.

Then, a method for producing a proton-conducting polymer solution will be described in more detail. This method for producing a proton-conducting polymer solution is not particularly limited, and, for example, a solution of a proton-conducting polymer dissolved or dispersed in a solvent is obtained, and then an additive is dispersed in the liquid as needed. Alternatively, first, a proton-conducting polymer is melt-extruded and subjected to a step such as drawing to mix the proton-conducting polymer and an additive, and the mixture is dissolved or dispersed in a solvent. In this manner, a proton-conducting polymer solution is obtained.

More specifically, first, a processed material comprising a precursor polymer of a proton-conducting polymer is immersed in a basic reaction liquid for hydrolysis. Due to this hydrolysis treatment, the above precursor polymer of the proton-conducting polymer is converted into the proton-conducting polymer. Next, the above processed material subjected to hydrolysis treatment is sufficiently water-washed with warm water or the like, and then the processed material is subjected to acid treatment. The acid used for the acid treatment is not particularly limited, but mineral acids such as hydrochloric acid, sulfuric acid, and nitric acid, and organic acids such as oxalic acid, acetic acid, formic acid, and trifluoroacetic acid are preferred. Due to this acid treatment, the precursor polymer of the proton-conducting polymer is protonated, and the proton-conducting polymer, for example, perfluorocarbon sulfonic acid resin, is obtained.

The above processed material (the processed material comprising the proton-conducting polymer) subjected to acid treatment as described above is dissolved or suspended in a solvent in which the above proton-conducting polymer can be dissolved or suspended (a solvent having good affinity for the polymer). Examples of such a solvent include water, protic organic solvents such as ethanol, methanol, n-propanol, isopropyl alcohol, butanol, and glycerin, and aprotic organic solvents such as N,N-dimethylformamide, N,N-dimethylacetamide, and N-methylpyrrolidone. One of these is used alone, or two or more of these are used in combination. Particularly, when one solvent is used, the solvent is preferably water. When two or more solvents are used in combination, a mixed solvent of water and a protic organic solvent or protic organic solvents is preferred.

The method for dissolving or dispersing (suspending) the proton-conducting polymer in the solvent is not particularly limited. For example, the proton-conducting polymer may be dissolved or dispersed in the above solvent as it is. However, the proton-conducting polymer is preferably dissolved or dispersed in the solvent in the temperature range of 0 to 250° C. under atmospheric pressure or under conditions in which they are sealed and pressurized in an autoclave or the like. Particularly, when water and a protic organic solvent are used as the solvent, the mixing ratio between water and the protic organic solvent can be appropriately selected according to the dissolution method, the dissolution conditions, the type of the proton-conducting polymer, the total solid concentration, the dissolution temperature, the stirring speed, and the like. However, the mass ratio of the protic organic solvent to water is preferably 0.1 to 10 of the protic organic solvent to 1 of water, more preferably 0.1 to 5 of the protic organic solvent to 1 of water.

One or two or more of an emulsion, a suspension, a colloidal liquid, and a micellar liquid may be included in the proton-conducting polymer solution. Here, the emulsion is a liquid in which liquid particles are dispersed as colloidal particles or particles coarser than the colloidal particles for emulsification. In addition, the suspension is a liquid in which solid particles are dispersed as colloidal particles, or particles at a microscopically visible level. Further, the colloidal liquid is in a state in which macromolecules are dispersed, and the micellar liquid is a lyophilic colloid disperse system formed by the association of a large number of small molecules by intermolecular forces.

The proton-conducting polymer solution can also be concentrated or filtered according to the processing method and application of the electrolyte membrane. The method of concentration is not particularly limited, and examples thereof include a method of heating the proton-conducting polymer solution to evaporate the solvent, and a method of reduced pressure concentration. When the proton-conducting polymer solution is used as an application solution, the solid ratio of the proton-conducting polymer solution is preferably 0.5% by mass or more and 50% by mass or less from the viewpoint of inhibiting an increase in viscosity to further increase handling properties, and the viewpoint of improving productivity.

The method for filtering the proton-conducting polymer solution is not particularly limited, and typical examples include a method of pressure filtration using a filter. For the above filter, a filter medium whose 90% collected particle diameter is 10 times to 100 times the average particle diameter of the solid particles included in the proton-conducting polymer solution is preferably used. Examples of the material of this filter medium include paper and metals. Particularly when the filter medium is paper, the 90% collected particle diameter is preferably 10 times to 50 times the average particle diameter of the above solid particles. When a metal filter is used, the 90% collected particle diameter is preferably 50 times to 100 times the average particle diameter of the above solid particles. Setting the 90% collected particle diameter at 10 times or more the average particle diameter is effective in inhibiting the pressure required at the time of liquid feed from becoming too high, and inhibiting the filter from clogging in a short period. On the other hand, setting the 90% collected particle diameter at 100 times or less the average particle diameter is preferred from the viewpoint of well removing such aggregates of the particles, and an undissolved resin, as to cause foreign substances in a film.

The electrolyte membrane in this embodiment preferably comprises, in a combined state, a nanofiber sheet having an average coefficient of linear expansion of 200 ppm/K or less from 20° C. to 120° C. in the in-plane direction, and a proton-conducting polymer having an average coefficient of linear expansion of 1550 ppm/K or less from 20° C. to 120° C. in the in-plane direction of a sheet shape having a thickness of 15 μm, when processed so as to have the sheet shape having a thickness of 15 μm. Such an electrolyte membrane can achieve chemical durability and physical durability under a severe cell driving environment at 120° C. at higher levels.

The electrolyte membrane in this embodiment is preferably an electrolyte membrane having a sheet shape in which a nanofiber sheet having a basis weight of 1.5 g/m² or more and 4.0 g/m² or less and having an average coefficient of linear expansion of 250 ppm/K or less from 20° C. to 120° C. in the in-plane direction, and a proton-conducting polymer having an average coefficient of linear expansion of 1550 ppm/K or less from 20° C. to 120° C. in the in-plane direction of a sheet shape having a thickness of 15 μm, when processed so as to have the sheet shape having a thickness of 15 μm, are combined. Such an electrolyte membrane is better in the filling properties of the electrolyte and the inhibition of dimensional change in the in-plane direction of the sheet. As a result, this electrolyte membrane can achieve high proton conductivity and excellent chemical durability and physical durability under a severe cell driving environment at 120° C. at higher levels.

The electrolyte membrane in this embodiment is preferably used as an electrolyte membrane particularly in a polymer electrolyte fuel cell. In the electrolyte membrane in this embodiment, the filling-up properties of the proton-conducting polymer are excellent, and void defects are inhibited. As a result, the electrolyte membrane in this embodiment can be used as an electrolyte membrane for a polymer electrolyte fuel cell in which dimensional change in the in-plane direction is inhibited and low resistance can also be achieved even in a severe fuel cell operation environment under high temperature and high humidification to high temperature and low humidification exceeding 110° C.

EXAMPLES

The present invention will be more specifically described below using Examples and Comparative Examples. The present invention is not limited by the following Examples in any way.

<Average Coefficients of Linear Expansion of Composite Polymer Electrolyte Membrane from 20° C. to 120° C. or 150° C. in Sheet In-Plane Direction>

With the machine direction (MD) and the direction orthogonal to MD, the transverse direction (TD) when a composite polymer electrolyte membrane was processed into a sheet shape distinguished, the composite polymer electrolyte membrane was cut to a length (that is, in MD) of 30 mm and a width (that is, in TD) of 3 mm to obtain a sample. Then, in a thermomechanical analysis apparatus (TMA/SS610: EXSTAR6000 connection station-mounted apparatus, manufactured by SII NanoTechnology Inc.), the sample was mounted on a quartz probe at a distance between chucks of 20 mm, and displacement measurement from 20° C. to 170° C. was performed under the conditions of a tensile mode, a load of 25 mN, and a heating rate of 5° C./min. From the measurement results, the average coefficients of linear expansion (coefficients of thermal expansion, CTE) from 20° C. to 120° C. or from 20° C. to 150° C. were calculated by the attached analysis software.

<Average Coefficients of Linear Expansion of Nanofiber Sheet from 20° C. to 120° C. in In-Plane Direction>

With the machine direction (MD) and the direction orthogonal to MD, the transverse direction (TD) when a nanofiber sheet was processed into a sheet shape distinguished, the nanofiber sheet was cut to a length (that is, in MD) of 30 mm and a width (that is, in TD) of 3 mm to obtain a sample. Then, in a thermomechanical analysis apparatus (TMA/SS610: EXSTAR6000 connection station-mounted apparatus, manufactured by SII NanoTechnology Inc.), the sample was mounted on a quartz probe at a distance between chucks of 20 mm, and displacement measurement from 20° C. to 170° C. was performed under the conditions of a tensile mode, a load of 25 mN, and a heating rate of 5° C./min. From the measurement results, the average coefficients of linear expansion (coefficients of thermal expansion, CTE) from 20° C. to 120° C. were calculated by the attached analysis software.

<Average Coefficients of Linear Expansion of Proton-Conducting Polymer Sheet from 20° C. to 120° C. in In-Plane Direction>

A proton-conducting polymer sheet having a thickness of 15 μm was cut to 30 mm×3 mm to obtain a sample. Then, in a thermomechanical analysis apparatus (TMA/SS610: EXSTAR6000 connection station-mounted apparatus, manufactured by SII NanoTechnology Inc.), the sample was mounted on a quartz probe at a distance between chucks of 20 mm, and displacement measurement from 20° C. to 170° C. was performed under the conditions of a tensile mode, a load of 25 mN, and a heating rate of 5° C./min. From the measurement results, the average coefficients of linear expansion (coefficients of thermal expansion, CTE) from 20° C. to 120° C. were calculated by the attached analysis software.

<Porosity of Nanofiber Sheet>

The mass of a nanofiber sheet cut into a 40 mm×30 mm rectangle was measured by a precision balance, and from the measured mass and the thickness of the nanofiber sheet, the film density $\rho$ (g/cm³) was calculated by the following formula (A). From the obtained film density $\rho$ and the true density of the material constituting the nanofiber sheet, $\rho_0$ (g/cm³), the porosity (%) was obtained by the following formula (B).

$$\rho = M/(4.0 \times 3.0 \times t) \tag{A}$$

wherein M represents the mass (g) of the sample, and t represents the thickness (cm) of the sample.

$$\text{porosity (\%)} = (1-(\rho/\rho_0)) \times 100 \tag{B}$$

<Calculation of Basis Weight>

The mass of a nanofiber sheet cut into a 200 mm×150 mm rectangle was measured and converted into mass per m² to calculate the basis weight.

<Shrinkage Rate of Nanofiber Sheet>

The thickness of a composite polymer electrolyte membrane, and the thickness of the nanofiber sheet in the electrolyte membrane, Z1 (nm), were measured as described later. The thickness of the nanofiber sheet before combination, Z2 (nm), was measured using a contact type film thickness meter (product name "ABS Digimatic Indicator ID-F125" manufactured by Mitutoyo Corporation). From the thickness of the nanofiber sheet in the electrolyte membrane, Z1, and the thickness of the nanofiber sheet before combination, Z2, the shrinkage rate was calculated by the following formula (D). The thickness of the nanofiber sheet, Z2, was the arithmetic mean of thickness in the form of including cavities, measured at any five points in the same nanofiber sheet.

$$\text{shrinkage rate } (\%) = (1-(Z1/Z2)) \times 100 \quad \text{(D)}$$

<Average Fiber Diameter of Nanofiber Sheet>

As the average fiber diameter of fibers in a nanofiber sheet, the arithmetic mean value of the fiber diameter of 50 fibers was used. Here, the "fiber diameter" refers to the length in the direction orthogonal to the length direction of the fiber, measured based on a 5000× electron micrograph of the fibers taken.

<Stress at 5% Elongation of Nanofiber Sheet>

The stress at 5% elongation of a nanofiber sheet was measured in accordance with JIS K-7127 in which the nanofiber sheet was cut into a 70 mm×10 mm rectangle as a sample. For the measurement, a tensile tester comprising a 50 N load cell was used. The measurement was performed under an environment at 24° C. and a relative humidity of 45% RH at a distance between chucks of 50 mm and a crosshead speed of 300 mm/min. As a result, the stress at 5% elongation of all nanofiber sheets of Examples 1 to 10 described later was 3.2 MPa or more.

<Determination of Filling-Up Properties of Proton-Conducting Polymer and Void Defects>

The filling-up properties of a proton-conducting polymer for a nanofiber sheet were evaluated as follows. A sheet arbitrarily cut from a composite polymer electrolyte membrane comprising a nanofiber sheet and a proton-conducting polymer was embedded in an epoxy adhesive, and it was processed by an ultramicrotome to obtain a sheet cross section sample. The cross section was stained with ruthenium and provided with electrical conductivity by osmium coating treatment, and a secondary electron image was observed over 10 mm using a scanning electron microscope (model "S-4800" manufactured by Hitachi High-Technologies Corporation). The observation magnification was 2000×. In the 10 mm region in which the proton-conducting polymer and the nanofiber sheet were combined, observed as described above, the proportion of the regions which were not filled with the proton-conducting polymer and in which cavity (void defect) portions were present was evaluated according to the following criteria:

A: the proportion of cavities is 0 to 2% or less

B: the proportion of cavities is more than 2% and 5% or less

C: the proportion of cavities is more than 5% and 100% or less

The filling-up properties of the proton-conducting polymer are preferably "A" or "B", further preferably "A", in the above criteria. When the cavities in the nanofiber sheet are completely filled with the proton-conducting polymer, cavities, which provide insulation resistance, do not form in the electrolyte membrane, and therefore a high performance composite polymer electrolyte membrane having low resistance is obtained.

<Thickness of Composite Polymer Electrolyte Membrane and Thickness of Nanofiber Sheet in Electrolyte Membrane>

The thickness of an electrolyte membrane and the thickness of the nanofiber sheet in the electrolyte membrane, Z1, were measured as follows. First, a sheet arbitrarily cut from a composite polymer electrolyte membrane comprising a nanofiber sheet and a proton-conducting polymer was embedded in an epoxy adhesive, and it was processed by an ultramicrotome to obtain a sheet cross section sample. The cross section was stained with ruthenium and provided with electrical conductivity by osmium coating treatment, and a secondary electron image was observed over 10 mm using a scanning electron microscope (model "S-4800" manufactured by Hitachi High-Technologies Corporation). The observation magnification was 2000× to 3000×. In the 10 mm region observed as described above, the thickness of the sheet was measured, and the thickness of the nanofiber sheet in the thickness direction of the sheet was measured by the contrast difference from the proton-conducting polymer.

<In-Plane Dimensional Change Rates>

The in-plane dimensional change rates of an electrolyte membrane under the conditions of 120° C. and 100% RH were obtained as follows. First, the frame of an approximately 15 mm×20 mm rectangle was drawn on the electrolyte membrane, and the length of each side was measured by a measuring microscope (model "STM6" manufactured by OLYMPUS). Then, the above electrolyte membrane was introduced into a Highly Accelerated Stress Test System (model "EHS-211" manufactured by HAST) and exposed to an environment at 120° C. and 100% RH for 2 hours, and then the length of each side of the frame of the rectangle was measured in the same manner as above. The rates of change of dimensions before and after the acceleration test by the Highly Accelerated Stress Test System were calculated for the respective directions of the short side and long side of the rectangle, and the average values were taken as the dimensional change rates of the electrolyte membrane.

<Dimensional Change Rate in Film Thickness Direction>

The dimensional change rate of an electrolyte membrane in the film thickness direction under the conditions of 120° C. and 100% RH was obtained as follows. First, the thickness at nine points at any positions in an area of 30 mm×40 mm in the electrolyte membrane was measured using a contact type film thickness meter (product name "ABS Digimatic Indicator ID-F125" manufactured by Mitutoyo Corporation). Then, the above electrolyte membrane was introduced into a Highly Accelerated Stress Test System (model "EHS-211" manufactured by HAST) and exposed to an environment at 120° C. and 100% RH for 2 hours, and then the film thickness was rapidly measured in a wet state in the same manner as above. The rates of change of film thickness before and after the acceleration test by the Highly Accelerated Stress Test System were calculated, and the average value was taken as the dimensional change rate of the electrolyte membrane in the film thickness direction.

Example 1

<Production of Composite Polymer Electrolyte Membrane>

First, pellets of a precursor of a perfluorosulfonic acid resin (ion exchange capacity after hydrolysis and acid treatment: 1.4 meq/g) obtained from tetrafluoroethylene and $CF_2=CFO(CF_2)_2$—$SO_2F$, which was a precursor polymer of a proton-conducting polymer, were provided. Next, the precursor pellets were brought into contact with an aqueous solution in which potassium hydroxide (15% by mass) and methyl alcohol (50% by mass) were dissolved, at 80° C. for 20 hours for hydrolysis treatment. Then, the pellets were immersed in water at 60° C. for 5 hours. Then, treatment in which the pellets after being immersed in water were immersed in a 2 N hydrochloric acid aqueous solution at 60° C. for 1 hour was repeated five times with the hydrochloric acid aqueous solution replaced by a new one every time. Then, the pellets after being repeatedly immersed in the hydrochloric acid aqueous solution was water-washed with ion-exchanged water and dried. Thus, a perfluorocarbon sulfonic acid resin (—$[CF_2CF_2]$—$[CF_2$—$CF(-O-(CF_2)_2$—$SO_3H)]$—; PFSA), which was a proton-conducting polymer, was obtained.

These pellets were contained and sealed in a 5 L autoclave together with an ethanol aqueous solution (water:ethanol=50.0/50.0 (mass ratio)), and the mixture was heated to 160° C. while being stirred by a stirring blade and maintained at the temperature for 5 hours. Then, the inside of the autoclave was naturally cooled to obtain a uniform perfluorocarbon sulfonic acid resin solution having a solid concentration of 5% by mass. The perfluorocarbon sulfonic acid resin solution was concentrated under reduced pressure at 80° C., and then diluted using water and ethanol, to prepare a solution with ethanol:water=60:40 (mass ratio) comprising 15.0% by mass of solids, as a solution 1.

The above solution 1 was continuously applied onto a polyimide film (trade name "Kapton 300H" manufactured by DU PONT-TORAY CO., LTD.) using a coating die coater. Then, the nanofibers described in Example 1 in the following Table 1 were placed on the solution 1 applied as described above, and impregnated with the solution 1 followed by air drying for rough drying. Then, the film after the rough drying was dried by a dryer (model "SPH-201M" manufactured by ESPEC Corp.) with a setting of 120° C. for 30 minutes. Next, the solution 1 was again applied onto the film after the drying in the same manner as above, and dried with a setting of 120° C. for 30 minutes in the same manner. The thus obtained film was subjected to annealing treatment with a setting of 170° C. for 20 minutes to obtain a composite polymer electrolyte membrane having a thickness of 16 μm. For the obtained composite polymer electrolyte membrane, the average coefficients of linear expansion in the machine direction (MD) and the direction orthogonal to MD, the transverse direction (TD), the in-plane dimensional change rates, the dimensional change rate in the film thickness direction, the shrinkage rate of the nanofiber sheet, and the determination of void defects were evaluated. The results are shown in Table 1. In addition, the results of evaluating the average coefficients of linear expansion from 20° C. to 120° C. in the in-plane direction for the nanofiber sheet used in Example 1 are shown in Table 2. Further, an SEM photograph of a surface of the nanofiber sheet used in Example 1 is shown in FIG. 3.

Example 2

Except that the nanofiber sheet described in Example 2 in Table 1 was used, a composite polymer electrolyte membrane having a thickness of 15 μm was made by the same method as Example 1, and evaluation was performed. The results are shown in Table 1.

Example 3

Except that the nanofiber sheet described in Example 3 in Table 1 was used and the conditions of the annealing treatment were changed to 150° C. and 20 minutes, a composite polymer electrolyte membrane having a thickness of 10 μm was made by the same method as Example 1, and evaluation was performed. The results are shown in Table 1.

Example 4

Except that the nanofibers described in Example 4 in Table 1 were used, a composite polymer electrolyte membrane having a thickness of 10 μm was made by the same method as Example 3, and evaluation was performed. The results are shown in Table 1.

Example 5

Except that the thickness of the composite polymer electrolyte membrane of Example 4 was changed to 15 μm, a composite polymer electrolyte membrane was made by the same method as Example 4, and evaluation was performed. The results are shown in Table 1.

Example 6

Except that the nanofiber sheet described in Example 6 in Table 1 was used, a composite polymer electrolyte membrane was made by the same method as Example 5, and evaluation was performed. The results are shown in Table 1. An SEM photograph of a cross section of the composite polymer electrolyte membrane of Example 6 is shown in FIG. 4. In FIG. 4, numeral 1 denotes the composite layer of the nanofiber sheet and the proton-conducting polymer, and numeral 3 denotes the proton-conducting polymer layers. The results of evaluating the average coefficients of linear expansion from 20° C. to 120° C. in the in-plane direction for the nanofiber sheet used in Example 6 are shown in Table 2.

Example 7

Except that the conditions of the annealing treatment were changed to 160° C. and 20 minutes, a composite polymer electrolyte membrane was made by the same method as Example 6, and evaluation was performed. The results are shown in Table 1.

Example 8

Except that the nanofiber sheet described in Example 8 in Table 1 was used, a composite polymer electrolyte membrane was made by the same method as Example 6, and evaluation was performed. The results are shown in Table 1.

Example 9

Except that the nanofiber sheet described in Example 9 in Table 1 was used, a composite polymer electrolyte membrane was made by the same method as Example 6, and evaluation was performed. The results are shown in Table 1.

Example 10

Except that the nanofiber sheet described in Example 10 in Table 1 was used, a composite polymer electrolyte membrane was made by the same method as Example 6, and evaluation was performed. The results are shown in Table 1. The results of evaluating the average coefficients of linear expansion from 20° C. to 120° C. in the in-plane direction for the nanofiber sheet used in Example 10 are shown in Table 2.

Comparative Example 1

Except that no nanofiber sheet was used, a polymer electrolyte membrane having a thickness of 15 μm was made by the same method as Example 6, and evaluation was performed. The results are shown in Table 1.

Comparative Example 2

Except that no nanofiber sheet was used, a polymer electrolyte membrane having a thickness of 15 μm was made by the same method as Example 2, and evaluation was performed. The results are shown in Table 1.

Comparative Example 3

Except that the nanofibers described in Comparative Example 3 in Table 1 were used, a polymer electrolyte membrane having a thickness of 15 μm was made by the same method as Example 6, and evaluation was performed. The material of the nanofiber sheet was polyvinylidene fluoride. The results are shown in Table 1. The results of evaluating the average coefficients of linear expansion from 20° C. to 120° C. in the in-plane direction for the nanofiber sheet used in Comparative Example 3 are shown in Table 2.

Comparative Example 4

Except that the nanofiber sheet described in Comparative Example 4 in Table 1 (subjected to calendering heat treatment at 140° C.) was used, a composite polymer electrolyte membrane having a thickness of 15 μm was made by the same method as Example 6, and evaluation was performed. The material of the nanofiber sheet was a blended fabric of polyvinylidene fluoride and polyethersulfone at a mass ratio of 7:3. The results are shown in Table 1. The in-plane dimensional change rates and the dimensional change rate in the film thickness direction were not measured because there were many void defects.

Comparative Example 5

Except that the nanofiber sheet described in Comparative Example 5 in Table 1 was used, a composite polymer electrolyte membrane having a thickness of 15 μm was made by the same method as Example 6, and evaluation was performed. The results are shown in Table 1.

Comparative Example 6

Except that the nanofiber sheet described in Comparative Example 6 in Table 1 (subjected to calendering heat treatment at 140° C.) was used, a composite polymer electrolyte membrane having a thickness of 15 μm was made by the same method as Example 6, and evaluation was performed. The results are shown in Table 1. The in-plane dimensional change rates and the dimensional change rate in the film thickness direction were not measured because there were many void defects.

Comparative Example 7

Except that the nanofiber sheet described in Comparative Example 7 in Table 1 was used, a composite polymer electrolyte membrane having a thickness of 15 μm was made by the same method as Example 6, and evaluation was performed. The material of the nanofiber sheet was polyacrylonitrile. The results are shown in Table 1. An SEM photograph of a cross section of the composite polymer electrolyte membrane of Comparative Example 8 is shown in FIG. 6. The average coefficients of linear expansion from 20° C. to 150° C. could not be measured because the combined nanofibers deteriorated. The results of evaluating the average coefficients of linear expansion from 20° C. to 120° C. in the in-plane direction for the nanofiber sheet used in Comparative Example 7 are shown in Table 2.

Comparative Example 8

Except that the nanofiber sheet described in Comparative Example 8 in Table 1 was used, a composite polymer electrolyte membrane having a thickness of 10 μm was made by the same method as Example 4, and evaluation was performed. The results are shown in Table 1.

Comparative Example 9

As a comparison, the results of evaluating the average coefficients of linear expansion from 20° C. to 120° C., the thickness, and the in-plane dimensional change rates and the dimensional change rate in the film thickness direction for a commercially available electrolyte membrane Nafion 211 (trade name, manufactured by Dupont) are shown in Table 1. The average coefficients of linear expansion from 20° C. to 150° C. could not be measured because a deformation of 5 mm or more exceeding the specification range of the apparatus occurred.

TABLE 1

| | 20-120° C. CTE (ppm/k) | | 20-150° C. CTE (ppm/k) | | Nanofiber sheet | | | | |
| | MD Direction | TD Direction | MD Direction | TD Direction | Material | Average fiber diameter nm | Basis weight g/m² | Porosity % | Thickness μm |
|---|---|---|---|---|---|---|---|---|---|
| Example 1 | 71 | 82 | 89 | 93 | PBI | 250 | 2.2 | 85 | 13 |
| Example 2 | 5 | 24 | 18 | 30 | PBI | 250 | 3.5 | 87 | 20 |
| Example 3 | 158 | 222 | 143 | 206 | PES | 200 | 2.5 | 84 | 11 |
| Example 4 | 178 | 218 | 159 | 200 | PES | 350 | 2.5 | 84 | 11 |
| Example 5 | 221 | 250 | 200 | 216 | PES | 350 | 2.5 | 84 | 11 |
| Example 6 | 237 | 212 | 222 | 303 | PES | 350 | 3.1 | 85 | 15 |
| Example 7 | 123 | 137 | 128 | 154 | PES | 350 | 3.1 | 85 | 15 |

TABLE 1-continued

| | | | | | | | | | |
|---|---|---|---|---|---|---|---|---|---|
| Example 8 | 217 | 254 | 197 | 230 | PES | 350 | 3.1 | 79 | 11 |
| Example 9 | 154 | 211 | 147 | 192 | PES | 450 | 3.1 | 84 | 15 |
| Example 10 | 187 | 206 | 197 | 216 | PI | 350 | 3.1 | 84 | 15 |
| Comparative Example 1 | 1141 | 1141 | 2139 | 2139 | NA | NA | NA | NA | NA |
| Comparative Example 2 | 1348 | 1348 | 1868 | 1868 | NA | NA | NA | NA | NA |
| Comparative Example 3 | 227 | 291 | 349 | 368 | PVDF | 350 | 5.0 | 84 | 18 |
| Comparative Example 4 | 215 | 268 | 298 | 350 | PES7P VDF3 | 350 | 5.0 | 60 | 12 |
| Comparative Example 5 | 182 | 191 | 161 | 180 | PES | 350 | 5.0 | 84 | 24 |
| Comparative Example 6 | 158 | 193 | 141 | 175 | PES | 350 | 5.0 | 65 | 13 |
| Comparative Example 7 | 130 | 256 | — | — | PAN | 270 | 4.6 | 83 | 24 |
| Comparative Example 8 | 669 | 784 | 1002 | 1295 | PES | 350 | 1.1 | 82 | 5 |
| Comparative Example 9 | 1620 | 1620 | — | — | NA | NA | NA | NA | NA |

| | Composite polymer electrolyte membrane | | | | | | | |
|---|---|---|---|---|---|---|---|---|
| | Annealing temperature ° C. | Electrolyte membrane thickness μm | Thickness of nanofiber sheet μm | Shrinkage rate of nanofiber sheet % | Void defects determination | In-plane dimensional change rate (MD) % | In-plane dimensional change rate (TD) % | Dimensional change rate in film thickness direction % |
| Example 1 | 170 | 16 | 6 | 54% | A | 10 | 12 | 95 |
| Example 2 | 170 | 15 | 7 | 65% | A | 7 | 8 | 88 |
| Example 3 | 150 | 10 | 4 | 64% | A | 4 | 6 | 207 |
| Example 4 | 150 | 10 | 5 | 54% | A | 5 | 6 | 196 |
| Example 5 | 150 | 15 | 4 | 64% | A | 6 | 12 | 208 |
| Example 6 | 150 | 15 | 6 | 60% | A | 5 | 9 | 390 |
| Example 7 | 160 | 15 | 6 | 60% | A | 7 | 12 | 150 |
| Example 8 | 150 | 15 | 5 | 54% | A | 6 | 9 | 195 |
| Example 9 | 150 | 15 | 6 | 60% | A | 8 | 11 | 225 |
| Example 10 | 150 | 15 | 6 | 60% | A | 6 | 8 | 375 |
| Comparative Example 1 | 150 | 15 | NA | — | — | 57 | 57 | 100 |
| Comparative Example 2 | 170 | 15 | NA | — | — | 39 | 39 | 40 |
| Comparative Example 3 | 150 | 15 | 9 | 50% | B | 9 | 15 | 190 |
| Comparative Example 4 | 150 | 15 | 8 | 33% | C | — | — | — |
| Comparative Example 5 | 150 | 15 | 9 | 62% | B | 4 | 9 | 247 |
| Comparative Example 6 | 150 | 15 | 8 | 38% | C | — | — | — |
| Comparative Example 7 | 150 | 15 | 7 | 70% | C | 6 | 18 | 188 |
| Comparative Example 8 | 150 | 10 | 2 | 60% | A | 19 | 28 | 140 |
| Comparative Example 9 | — | 25 | NA | — | — | 27 | 27 | 36 |

TABLE 2

| | 20-120° C. CTE (ppm/k) | |
|---|---|---|
| | MD Direction | TD Direction |
| Example 1 | 28 | 37 |
| Example 6 | 60 | 28 |
| Example 10 | 43 | 47 |
| Comparative Example 3 | 412 | 697 |
| Comparative Example 7 | 49 | 446 |

INDUSTRIAL APPLICABILITY

The composite polymer electrolyte membrane of the present invention has industrial applicability as an electrolyte membrane for a fuel cell vehicle requiring high durability in a high temperature operation environment exceeding 110° C.

REFERENCE SIGNS LIST

1 . . . nanofiber sheet, 2 . . . electrode catalyst layer, 3 . . . proton-conducting polymer.

The invention claimed is:
1. A composite polymer electrolyte membrane comprising a nanofiber sheet having a basis weight of 1.5 g/m² or more and 4.0 g/m² or less, and a proton-conducting polymer,
the electrolyte membrane having a sheet shape in which the proton-conducting polymer and the nanofiber sheet are combined, and having an average coefficient of linear expansion of 300 ppm/K or less from 20° C. to 120° C. in an in-plane direction of the sheet shape, the proton-conducting polymer comprising one or more of a perfluorocarbon polymer compound having an ion exchange group, and a hydrocarbon polymer compound having an aromatic ring in a molecule into which an ion exchange groups is introduced, the nanofiber sheet comprising one or more resins selected from the group consisting of polyolefin resin, styrene resin, polyester resin, acrylic resin, polyamide resin, polyether resin, urethane resin, chlorine resin, fluorine resin, polyphenylene sulfide, polyamide resin, polyetheramide resin, aromatic polyetheramide resin, polysulfone resin, polyazole resin, cellulose resin and polyvinyl alcohol resin, a proportion of cavities which are present in the composite polymer electrolyte membrane is 0% or more and 2% or less, and a ratio of a thickness of the nanofiber sheet to a thickness of the electrolyte membrane is 25% or more and less than 60%.

2. The electrolyte membrane according to claim 1, wherein an average coefficient of linear expansion of the nanofiber sheet from 20° C. to 120° C. in an in-plane direction is 250 ppm/K or less.

3. The electrolyte membrane according to claim 1, wherein an average coefficient of linear expansion from 20° C. to 120° C. in an in-plane direction of a sheet shape having a thickness of 15 μm is 1550 ppm/K or less when the proton-conducting polymer is processed so as to have the sheet shape having a thickness of 15 μm.

4. The electrolyte membrane according to claim 1, wherein a porosity (%) of the nanofiber sheet is 75% or more and 90% or less, and a film thickness of the nanofiber sheet in the electrolyte membrane shrinks in a range of 50% or more and 75% or less compared with a film thickness before impregnation with the proton-conducting polymer.

5. The electrolyte membrane according to claim 1, wherein the nanofiber sheet comprises one or more selected from the group consisting of polyethersulfone, polybenzimidazole, and polyimide.

6. The electrolyte membrane according to claim 1, wherein an average fiber diameter of fibers in the nanofiber sheet is 100 nm or more and 500 nm or less, and a thickness of the nanofiber sheet before impregnation with the proton-conducting polymer is 8 μm or more and 28 μm or less.

7. The electrolyte membrane according to claim 1, wherein an average coefficient of linear expansion of the nanofiber sheet from 20° C. to 120° C. in an in-plane direction is 200 ppm/K or less, and an average coefficient of linear expansion from 20° C. to 120° C. in an in-plane direction of a sheet shape having a thickness of 15 μm is 1550 ppm/K or less when the proton-conducting polymer is processed so as to have the sheet shape having a thickness of 15 μm.

8. A composite polymer electrolyte membrane comprising a nanofiber sheet and a proton-conducting polymer, the electrolyte membrane having a sheet shape in which the proton-conducting polymer and the nanofiber sheet are combined, and having an average coefficient of linear expansion of 350 ppm/K or less from 20° C. to 150° C. in an in-plane direction of the sheet shape, the proton-conducting polymer comprising one or more of a perfluorocarbon polymer compound having an ion exchange group, and a hydrocarbon polymer compound having an aromatic ring in a molecule into which an ion exchange groups is introduced, the nanofiber sheet comprising one or more resins selected from the group consisting of polyolefin resin, styrene resin, polyester resin, acrylic resin, polyamide resin, polyether resin, urethane resin, chlorine resin, fluorine resin, polyphenylene sulfide, polyamide resin, polyetheramide resin, aromatic polyetheramide resin, polysulfone resin, polyazole resin, cellulose resin and polyvinyl alcohol resin, and a proportion of cavities which are present in the composite polymer electrolyte membrane is 0% or more and 2% or less, and a ratio of a thickness of the nanofiber sheet to a thickness of the electrolyte membrane is 25% or more and less than 60%.

9. A composite polymer electrolyte membrane comprising a nanofiber sheet having a basis weight of 1.5 g/m$^2$ or more and 4.0 g/m$^2$ or less, and a proton-conducting polymer, the electrolyte membrane having a sheet shape in which the proton-conducting polymer and the nanofiber sheet are combined, the proton-conducting polymer having a sheet shape, an average coefficient of linear expansion of the nanofiber sheet from 20° C. to 120° C. in an in-plane direction being 250 ppm/K or less, and an average coefficient of linear expansion from 20° C. to 120° C. in an in-plane direction of a sheet shape having a thickness of 15 μm being 1550 ppm/K or less when the proton-conducting polymer is processed so as to have the sheet shape having a thickness of 15 μm, the proton-conducting polymer comprising one or more of a perfluorocarbon polymer compound having an ion exchange group, and a hydrocarbon polymer compound having an aromatic ring in a molecule into which an ion exchange groups is introduced, the nanofiber sheet comprising one or more resins selected from the group consisting of polyolefin resin, styrene resin, polyester resin, acrylic resin, polyamide resin, polyether resin, urethane resin, chlorine resin, fluorine resin, polyphenylene sulfide, polyamide resin, polyetheramide resin, aromatic polyetheramide resin, polysulfone resin, polyazole resin, cellulose resin and polyvinyl alcohol resin, and a proportion of cavities which are present in the composite polymer electrolyte membrane is 0% or more and 2% or less, and a ratio of a thickness of the nanofiber sheet to a thickness of the electrolyte membrane is 25% or more and less than 60%.

\* \* \* \* \*